(No Model.)
L. B. WHITE.
APPARATUS FOR FLAVORING CIGARS.
No. 572,323. Patented Dec. 1, 1896.
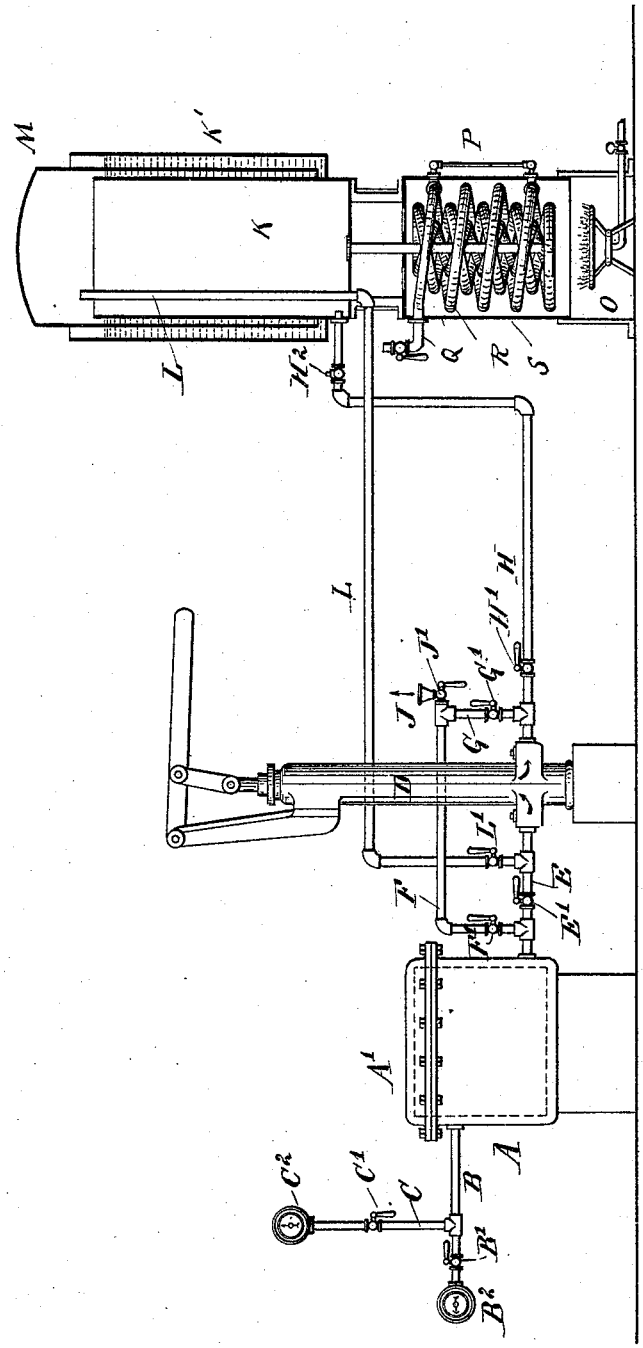

UNITED STATES PATENT OFFICE.

LEWIS B. WHITE, OF NEW YORK, N. Y.

APPARATUS FOR FLAVORING CIGARS.

SPECIFICATION forming part of Letters Patent No. 572,323, dated December 1, 1896.

Application filed February 17, 1896. Serial No. 579,612. (No model.)

*To all whom it may concern:*

Be it known that I, LEWIS B. WHITE, a citizen of the United States, and a resident of the city of New York, in the county of New York and State of New York, have invented certain new and useful Improvements in Apparatus for Flavoring Cigars, of which the following is a specification.

This invention relates to a new and improved apparatus for flavoring cigars of all kinds.

The object of my invention is to provide a new and improved apparatus for extracting the noxious, foul, and disagreeable soluble substances, such as, for example, nicotine, from cigars, and to impregnate the cigars with a flavoring extract, such as, for example, tonka-bean extract, the extract of pure Havana tobacco, so as to render the cigars very agreeable and of a rich and palatable flavor.

In the accompanying drawing, forming a part of this specification, an elevation of my improved apparatus for treating cigars is shown, parts being in section.

A strong vessel A, serving for receiving the cigars to be treated, is provided with a cover A', which can be secured on the vessel by means of hinged bolts and nuts, so as to permit of applying and removing the cover rapidly.

A pipe B, having a cock B' and connected with the vessel A, carries a vacuum-gage $B^2$ at its outer end, and on the upper end of a branch pipe C of the pipe B a pressure-gage $C^2$ is fixed, said branch pipe C having a cock C'.

A pump D is connected by a pipe E with the vessel A, said pipe E having a stop-cock E', and between the vessel A and said stop-cock the pipe E has a branch pipe F, provided with a stop-cock F', which branch pipe F is connected by the pipe G, having the stop-cock G', with a pipe H, having a stop-cock H', and connected with the forcing end of the pump, the pipe E being connected with the suction end.

An outlet-nozzle J, having a stop-cock J', is connected with the pipe F beyond its connection with the pipe G, as shown.

The pipe H leads to the bottom of a tank K and has a check-valve $H^2$ adjacent to said tank. The tank K is surrounded by a jacket K', and the space between said tank and the jacket is filled with water to form a seal for a bell M, which is immersed in said water. A pipe L extends from the top of the tank K down through the bottom of the same and is connected with the pipe E between the stop-cock E' and the pump D, said pipe L having a stop-cock L'. A coiled pipe R, surrounded by a casing S, is connected with the bottom of the tank K and can be heated by a suitable burner O below said coil.

P is a gage-glass for the coil, and Q is the filling-pipe for the coil.

The operation is as follows: The cigars while still fresh and moist are placed into the vessel A and the cover A' is then bolted down firmly and securely. The cock C' in the pipe C is closed, as are also the cocks F' and L' in the pipes F and L and the cock H' in the pipe H. The cocks E' and G' in the pipes E and G, respectively, are opened, as is also the cock J' of the outlet-nozzle J. Then the pump D is worked and creates a vacuum of the desired degree in the vessel A, the noxious constituents being exhausted from the cigars in the vessel A and passing with the air from said vessel through the pipe E, the suction end of the pump, through the outlet end of the pump, the pipe G, and the outlet-nozzle J. When the desired degree of vacuum has been obtained, the cock E' open and the cock L' is opened, the cocks H' and F' remaining closed, and the vapors contained in the tank K and bell M, which were generated by heating a suitable flavoring extract, such as, for example, tonka-bean extract, in the coil R, are forced by the pressure exerted by the bell M through the pipes L and E into the vessel A. Then the cock E' is closed, the cock G' and F' opened, and the pump D worked, so as to draw the flavoring vapors through the pipes L and E into the pump and force them through the pipes H, G, F, and E into the vessel A. The pressure in said vessel is thus raised until the cigars are fully permeated with the flavoring vapors. Then the cocks F', L', and G' are closed and the cocks E' and H' opened and the pump worked to draw the vapors from the vessel A back into the tank K until the pressure in the vessel A arrives at the pressure of the outer air, whereupon the cover A' is removed and the highly and richly flavored cigars can be removed from said vessel.

The apparatus is very simple, and by means of a single pump the noxious substances are extracted from the cigars, the flavoring vapors forced into the cigars, and the vapors not required are forced back into the tank, so that there is no loss of flavoring extract.

Having thus described my invention, what I claim as new, and desire to secure by Letters Patent, is—

1. In an apparatus for flavoring cigars, the combination with a vessel for receiving cigars, of a pump connected with said vessel, both at its suction and at its forcing end, and a vapor-generator connected with said pump both at the suction and forcing end, pipes for making the above connections and proper cocks in said pipes, substantially as herein shown and described.

2. In an apparatus for flavoring cigars, the combination with a vessel for receiving cigars, of a pump, a tank, a pipe connecting the pump with the vessel, a cock in said pipe, a pipe connecting the pump with the tank, a cock in said pipe, a pipe connecting the above two pipes at opposite sides of the pump and having cocks and an outlet and means for generating vapors in the tank, substantially as herein shown and described.

3. In an apparatus for flavoring cigars, the combination with a vessel for receiving cigars, of a pump, a tank, pipes connecting the receiving vessel and the tank with the pump, cocks in said pipes, a connecting-pipe and cocks for establishing connections between either the suction or the forcing end of the pump and the receiving vessel and the tank, and a pipe for establishing direct communication between the tank and the receiving vessel and a cock in said pipe, substantially as herein shown and described.

In testimony that I claim the foregoing as my invention I have signed my name, in presence of two witnesses, this 23d day of December, 1895.

LEWIS B. WHITE.

Witnesses:
 OSCAR F. GUNZ,
 EDW. F. HAEGELE.